United States Patent
Eichner et al.

(10) Patent No.: US 9,470,561 B2
(45) Date of Patent: Oct. 18, 2016

(54) SENSOR ARRANGEMENT FOR A HYDRAULIC DISPLACER UNIT

(71) Applicant: Robert Bosch GmbH, Stuttgart (DE)

(72) Inventors: Wilfried Eichner, Neubulach (DE); Bernd Huehn, Elchingen (DE); Juergen Gintner, Elchingen (DE); Bernd Sailer, Voehringen (DE); Grit Geißler, Ulm (DE); Dirk van Aalst, Nersingen (DE); Hans-Joachim Vagt, Ulm (DE); Jochen Kircher, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 14/220,932

(22) Filed: Mar. 20, 2014

(65) Prior Publication Data
US 2014/0290397 A1    Oct. 2, 2014

(30) Foreign Application Priority Data

Mar. 26, 2013    (DE) .................. 10 2013 205 261

(51) Int. Cl.
*G01D 11/30*    (2006.01)
*G01D 11/24*    (2006.01)

(52) U.S. Cl.
CPC ............. *G01D 11/245* (2013.01); *G01D 11/30* (2013.01)

(58) Field of Classification Search
CPC ............................. G01D 11/245; G01D 11/30
See application file for complete search history.

(56) References Cited

U.S. PATENT DOCUMENTS

| | | | |
|---|---|---|---|
| 5,536,181 A * | 7/1996 | Karnavas | H05K 7/1084 439/381 |
| 6,547,531 B1 | 4/2003 | Cumbo et al. | |
| 2009/0143947 A1* | 6/2009 | Bezdek | F16H 61/0006 701/51 |

FOREIGN PATENT DOCUMENTS

DE    10 2005 059 564 A1    6/2007

* cited by examiner

*Primary Examiner* — Paul West
(74) *Attorney, Agent, or Firm* — Maginot, Moore & Beck LLP

(57) ABSTRACT

A sensor arrangement for a hydraulic displacer unit includes a plurality of sensors which, at least in some sections, are positioned jointly in a sensor housing. The sensors are configured to be contacted via a common plug.

10 Claims, 1 Drawing Sheet

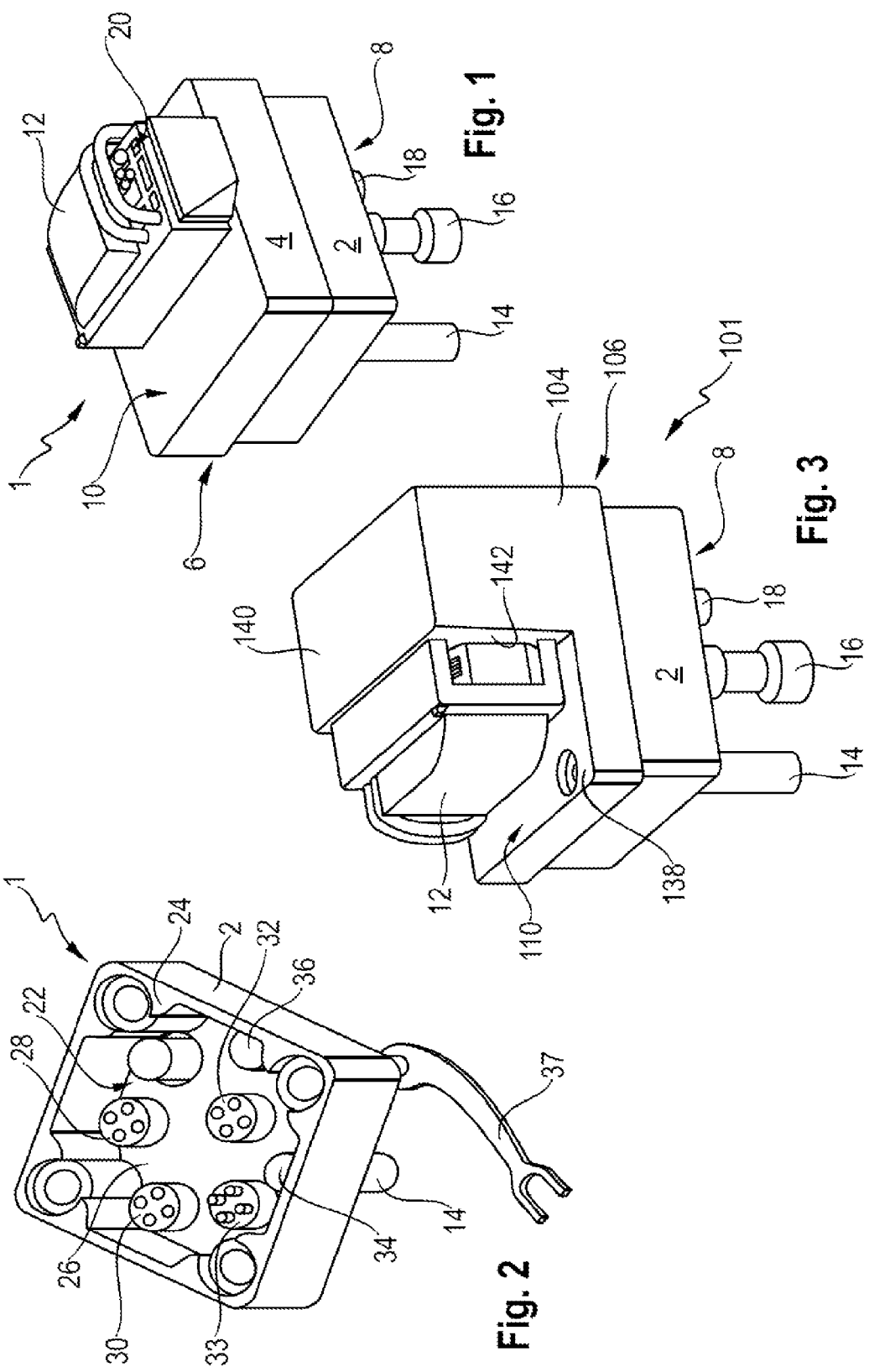

SENSOR ARRANGEMENT FOR A HYDRAULIC DISPLACER UNIT

This application claims priority under 35 U.S.C. §119 to patent application no. DE 10 2013 205 261.8, filed on Mar. 26, 2013 in Germany, the disclosure of which is incorporated herein by reference in its entirety.

The disclosure relates to a sensor arrangement for a hydraulic displacer unit.

BACKGROUND

A hydraulic displacer unit has different operating states, which can be characterized by process and state variables, such as temperature, pressure, rotational speed of a drive shaft or a pressurized medium volume flow of the displacer unit. In order to detect these variables, the displacer unit has a plurality of sensors, designated a sensor arrangement.

Laid-open specification DE 10 2005 059 564 A1 shows a hydraulic displacer unit having an abundance of separated sensors, which are arranged distributed over the displacer unit. In order to make contact with the individual sensors, a complicated cable harness is provided, a cable harness strand being needed for each sensor.

The disadvantage of this solution is that the sensors arranged in a distributed manner are susceptible to mechanical damage. In addition, the connection to the control unit via the cable harness is costly and, in the event of variants of the displacer unit, is complicated to handle. For example, each variant needs a dedicated cable harness, which represents high expenditure in terms of design, fabrication and logistics. In the event of different variants of the displacer unit, individual mechanical machining of the displacer unit itself is also needed for each variant. The expenditure is all the higher, the greater the number of sensors. For each variant of the displacer unit, individual protective devices, for example protective plates, additionally have to be designed, fabricated and mounted.

Patent specification U.S. Pat. No. 6,547,531 B1 shows a hydraulic displacer unit with which the aforementioned expenditure can be reduced. In this case, a plurality of sensors are arranged to be combined in a physically compact manner to form a sensor arrangement. The sensor arrangement occupies a very small physical section on and in the displacer unit and is surrounded by a control block for its mechanical protection.

It remains unclear how contact can be made with the multiplicity of sensors of the sensor arrangement.

SUMMARY

By contrast, the disclosure is based on the object of devising a compact sensor arrangement with which contact can be made simply in device terms.

This object is achieved by a sensor arrangement having the features described in the claims, the description, and the drawings.

A sensor arrangement for a hydraulic displacer unit has a plurality of sensors which, at least in some sections, are arranged jointly in a sensor housing. According to the disclosure, contact can be made with these sensors via a common plug.

The compact spatial arrangement in the common housing increases the ruggedness of the sensor arrangement. A further advantage of this arrangement is that, in the event of damage to one or more sensors, the accessibility to the sensors is made easier. In addition, a uniform electric and electronic interface is provided via the common plug. As a result of this integral approach according to the disclosure, a conventional cable harness for supplying sensors arranged separately can be dispensed with, which leads to a considerable reduction in fabrication and assembly costs. Likewise, in this way complicated mechanical protective designs for separate sensors and cable harness strands are obsolete. Combining the sensors in the common sensor housing additionally makes it superfluous to house each sensor individually. It is thus possible to make use of un-housed sensors, which can be mounted directly in the sensor housing, for example screwed in, plugged in or pressed in, and which are economical. In this way, a saving in costs as compared with currently used, costly standard sensors with protective housing is provided. In addition, because of the common arrangement in the sensor housing, only one EMC protective measure is needed for the sensors, by which means costs are reduced. A further advantage is that, as a result of the compact combination of the sensors in the sensor housing, a number of variants can be reduced considerably as compared with solutions with separate sensors. In addition, multi-functionality as compared with the present prior art can be offered by means of additional sensors in the sensor housing.

In a preferred development, the plug is arranged, in particular fixed, on the sensor housing. As a result, a particularly rugged and compact sensor arrangement is devised.

In a particularly preferred and advantageous development, the sensor arrangement has a fixed hole pattern, irrespective of the type and number of sensors. This results in a standardized connection pattern or, respectively, a uniform mechanical interface with respect to the displacer unit, which can be transferred simply to other series and/or nominal sizes of the displacer unit. By means of this uniform interface, variants in fabrication and therefore also costs of the fabrication are reduced and the sensor arrangement can be employed universally.

The sensor housing proves to be particularly compact if it is provided for arrangement on the housing of the displacer unit.

Advantageously, the sensors of the sensor arrangement can be energized via the plug and/or a signal connection can be made via the latter between the sensors and a control device. In this way, the plug performs two tasks.

Particularly preferably, the sensor arrangement has at least one pressure sensor and/or a temperature sensor and/or a rotational speed sensor and/or a pivot angle sensor and/or an acceleration sensor and/or a position sensor.

Here, a working pressure or a housing pressure or a feed pressure or a suction pressure or an actuating pressure of the displacer unit can preferably be determined via the at least one pressure sensor. A circuit temperature or a leakage oil temperature or an oil inlet temperature or a bearing temperature or a housing temperature can preferably be determined via the at least one temperature sensor.

It is possible to provide the sensors arranged on a printed circuit board in the sensor housing. As an alternative to this, it is also conceivable to arrange the sensors on another substrate in SMD technology or as a Mechatronic chip in MEMS design or in a wired design or in MID technology (MID is the abbreviation for molded interconnect devices).

In an advantageous development, the sensor arrangement has a memory unit, via which sensor data can be stored.

In order to be able to process or condition the sensor data, an advantageous development of the sensor arrangement can have a processor unit. Via the conditioning, in particular pre-evaluation, of the sensor data, standardized communication with higher-order control electronics can be carried out.

In a preferred development, the sensor arrangement has a control unit, in which the memory and processor unit are combined, wherein at least one actuator of the displacer unit can be driven via the control unit.

The control unit is preferably configured in such a way that evaluation algorithms can be executed therein, in particular condition monitoring or self-calibration.

The control unit preferably also has an output stage or amplifier unit generating a final actuating signal, which can be transmitted to an actuator of the displacer unit.

Communication with control electronics is advantageously carried out via the one plug, for example via a CAN protocol or an Ethernet/EtherCAT protocol.

The sensor arrangement is particularly advantageously developed if the control unit or the memory unit and/or the processor unit are also arranged within the sensor housing, at least in some sections. By means of this additional integration into the sensor housing, the sensor arrangement can be expanded to form on-board electronics OBE, which are able to perform additional control and regulation tasks for the displacer unit.

Via integration of, for example, acceleration sensors, additional functions such as the condition monitoring or diagnostic function implemented in the sensor arrangement can be provided.

The control unit is preferably configured in such a way that plausibility checks can be carried out therein.

The area of application of the sensor arrangement extends over hydraulic displacer units, in particular axial piston machines of swash plate or inclined shaft design. The displacer units can be designed to be adjustable or constant and find their application in particular in mobile working machines or industrial applications.

A displacer unit has a sensor arrangement which is configured in accordance with at least one aspect of the preceding description. It therefore has a plurality of sensors which, at least in some sections, are arranged jointly in a sensor housing and with which contact can be made via a common plug.

The displacer unit is preferably an axial piston machine of inclined shaft or swash plate design.

BRIEF DESCRIPTION OF THE DRAWINGS

Exemplary embodiments of a sensor arrangement according to the disclosure will be explained in more detail below by using three figures, in which:

FIG. 1 shows a first exemplary embodiment of a, sensor arrangement in a perspective view, FIG. 2 shows the exemplary embodiment according to FIG. 1 with the housing cover removed in a perspective view, and FIG. 3 shows a second exemplary embodiment of a sensor arrangement in a perspective view.

DETAILED DESCRIPTION

According to FIG. 1, a sensor arrangement 1 has a sensor housing 6 of approximately rectangular cross section, which has a lower housing part 2 and a housing cover 4. The last-named has a rectangular outline matched to the housing part 2, engaging laterally over the housing part 2. The sensor housing 6 can be attached or fastened via its housing underside 8, which is arranged on the housing part 2, to a housing of a displacer unit (not illustrated).

Signal lines 14, 16 and 18 emerge from the housing underside 8 of the sensor housing 6 and, when the sensor arrangement 1 is mounted, pass through the housing of the displacer unit.

The sensor housing 6 has a housing upper side 10, on which a plug 12 is arranged. On a side facing the viewer, said plug 12 has an opening with contact-making elements 20, via which contact can be made with sensors (cf. FIG. 2) of the sensor arrangement 1.

The inside of the sensor arrangement 1 is shown by FIG. 2. To this end, the housing cover 4 together with the plug 12 has been lifted off the sensor arrangement 1 and laid to the side (not illustrated). The housing 2 has a substantially cylindrical interior, which deepens from an upper side 24 of the housing part 2 in the direction of the housing underside 8 and is delimited by a housing base 26. A plurality of sensors is arranged on the housing base 26. These are: pressure sensors 28, 30, a rotational speed sensor 32, a temperature sensor 34 and a pivot angle sensor 36.

The last-named is coupled to a pivot arm 37, not illustrated in FIG. 1, which is attached to the housing underside 8 according to FIG. 1 and which can be coupled to a component, indicating the displacement volume, of the displacer unit implemented as an axial piston machine, for example to the cradle thereof.

The sensors 28, 30, 32, 34 and 36 are thus integrated into the rugged sensor housing 6, by which means they are arranged physically compactly and, in a manner that is simple in device terms, are protected against damage from outside and are accommodated in a manner free of electromagnetic interference (EMC). The protection against mechanical damage is in this case provided by means of appropriate dimensioning of the sensor housing 6.

As compared with the distributed arrangement of sensors, known from the prior art, which requires a complicated cable harness in order to make contact, making contact with the sensors 30 to 36 and exchanging sensor data with a control unit are carried out via the simple plug 12 according to FIG. 1.

FIG. 3 shows a sensor arrangement 101, which differs from the exemplary embodiment according to FIGS. 1 and 2 in the shape of its housing cover 104 and the arrangement of the plug 12. Accordingly, components that remain the same over the exemplary embodiments are provided with the same reference symbols in all the figures.

The housing cover 104 has a housing upper side 110 with a first step 138 arranged approximately parallel to the housing underside 8, and an elevated second step 140 extending parallel thereto. The two steps 138, 140 are connected to each other via a side surface 142. The side surface 142 here is in each case angled over approximately at right angles from the steps 138, 140. On the vertical side surface 140, the plug 12 is arranged in a direction that is opposite to the first exemplary embodiment. The opening thereof having the contact-making elements 20 (cf. FIG. 1) faces away from the observer here.

On account of the larger interior of the sensor arrangement 101 because of the second step 140 of the housing cover 104, the result is more space in the interior of the sensor housing 106 for the arrangement of sensors or, if appropriate, control units, so that a more variable sensor arrangement 101 is created.

The disclosure discloses a sensor arrangement for a hydraulic displacer unit, in particular an axial piston machine, which has a plurality of sensors which, at least in some sections, are arranged jointly in a sensor housing. Here, contact can be made with the sensors via a common plug.

What is claimed is:

1. A sensor arrangement for a hydraulic displacer unit, comprising:
   a sensor housing part that defines an interior;
   a plurality of sensors positioned within the interior;
   a sensor housing cover disposed over the sensor housing part so as to close off the interior and form a sensor housing; and
   a plug disposed on the sensor housing cover, and configured to provide electrical contact with the plurality of sensors,
   wherein the sensor housing part further defines a plurality of holes corresponding to the plurality of sensors so as to form a connection pattern configured to communicate with a hole arrangement of a housing of the hydraulic displacer unit.

2. The sensor arrangement according to claim 1, wherein at least one of:
   the plurality of sensors are configured to be energized via the plug; and
   the plug is configured to make a signal connection between the plurality of sensors and a control device.

3. The sensor arrangement according to claim 1, wherein the plurality of sensors includes at least one of:
   a pressure sensor;
   a temperature sensor;
   a rotational speed sensor;
   a pivot angle sensor;
   an acceleration sensor; and
   a position sensor.

4. The sensor arrangement according to claim 3, wherein the pressure sensor is configured to detect a working pressure, a housing pressure, a feed pressure, a suction pressure, or an actuating pressure.

5. The sensor arrangement according to claim 3, wherein the temperature sensor is configured to detect a circuit temperature, a leakage oil temperature, an oil inlet temperature, a bearing temperature, or a housing temperature.

6. The sensor arrangement according to claim 1, wherein the plurality of sensors are positioned on a printed circuit board or a component carrier.

7. The sensor arrangement according to claim 1, further comprising a memory unit configured to store sensor data from the plurality of sensors.

8. The sensor arrangement according to claim 1, further comprising a processor unit configured to process sensor data from the plurality of sensors.

9. The sensor arrangement according to claim 1, further comprising:
   a control unit configured to drive at least one actuator of the hydraulic displacer unit, and that includes:
      a memory unit configured to store sensor data from the plurality of sensors; and
      a processor unit configured to process sensor data from the plurality of sensors.

10. The sensor arrangement according to claim 9, wherein:
    the control unit is positioned in the interior of the sensor housing part; or
    at least one of:
       the memory unit is positioned in the interior of the sensor housing part; and
       the processor unit is positioned in the interior of the sensor housing part.

* * * * *